US008635252B2

(12) United States Patent
Binstock et al.

(10) Patent No.: US 8,635,252 B2
(45) Date of Patent: Jan. 21, 2014

(54) XBRL FLAT TABLE MAPPING SYSTEM AND METHOD

(75) Inventors: Cliff Binstock, Kirkland, WA (US); Brian Milnes, Mercer Island, WA (US)

(73) Assignee: XBRL Cloud, Inc., Port Townsend, WA (US)

( * ) Notice: Subject to any disclaimer, the term of this patent is extended or adjusted under 35 U.S.C. 154(b) by 0 days.

(21) Appl. No.: 13/424,314

(22) Filed: Mar. 19, 2012

(65) Prior Publication Data

US 2012/0239611 A1 Sep. 20, 2012

Related U.S. Application Data

(60) Provisional application No. 61/453,840, filed on Mar. 17, 2011, provisional application No. 61/453,833, filed on Mar. 17, 2011.

(51) Int. Cl.
*G06F 17/30* (2006.01)
*G06F 17/22* (2006.01)

(52) U.S. Cl.
CPC .................................. *G06F 17/2247* (2013.01)
USPC ............ 707/803; 707/602; 707/752; 707/809

(58) Field of Classification Search
CPC ....................... G06F 17/2247; G06F 17/30592
USPC ............ 707/1, 100, 102, 602, 803, 690, 756, 707/790, 792, 796, 802, 809, 812
See application file for complete search history.

(56) References Cited

U.S. PATENT DOCUMENTS

| 7,813,975 | B2 | 10/2010 | Takahashi |
| 7,822,769 | B2 | 10/2010 | Rohan |
| 7,836,394 | B2 * | 11/2010 | Linder .......................... 715/234 |
| 7,870,046 | B2 * | 1/2011 | Gupta ............................. 705/35 |
| 7,877,678 | B2 * | 1/2011 | Chopin et al. ................. 715/212 |
| 7,908,548 | B2 * | 3/2011 | Tangen et al. ................. 715/212 |
| 8,176,003 | B2 * | 5/2012 | Bush et al. .................... 707/602 |
| 8,280,856 | B2 * | 10/2012 | Rohan et al. .................. 707/687 |
| 8,346,811 | B2 * | 1/2013 | Wyatt et al. ................... 707/793 |
| 2008/0255974 | A1 | 10/2008 | Jacob |
| 2010/0121883 | A1 * | 5/2010 | Cutting et al. ................ 707/791 |
| 2011/0040697 | A1 * | 2/2011 | Constantinou et al. ....... 705/348 |
| 2011/0137923 | A1 * | 6/2011 | Koroteyev et al. ............ 707/756 |

* cited by examiner

*Primary Examiner* — Dangelino Gortayo
(74) *Attorney, Agent, or Firm* — ÆON Law; Adam L. K. Philipp

(57) ABSTRACT

XBRL data may be automatically mapped back and forth between an XBRL instance an set of automatically generated flat tables, where each table represents the projection of a single hypercube.

27 Claims, 12 Drawing Sheets

400

XBRL CONCEPTS:FACTS | XBRL DIMENSIONS:MEMBERS

| ID | Concept | Value | Context | Unit |
|---|---|---|---|---|
| 415A | Current Assets: | 35B | Context: Jan2010 | Unit: USD |
| 415B | Current Assets: | 20B | Context: May2010 | Unit: USD |
| 415C | Liabilities: | 15B | Context: May2010 | Unit: USD |
| 415D | Liabilities: | 10B | Context: Jan2010-Commercial | Unit: USD |
| 415E | Liabilities: | 25B | Context: Jan2010-Passenger | Unit: USD |
| 415F | Assets: | 50B | Context: Jan2010 | Unit: USD |
| 415G | Airplane Assets: | 23B | Context: Jan2010 | Unit: USD |
| 415H | Current Assets: | 25.5B | Context: Jan2010 | Unit: EUR |
| 415I | Assets: | 57B | Context: Jan2010-US | Unit: USD |
| 415J | Debt: | 12B | Context: Jan2010 | Unit: USD |

| ID | Context ID | Period | Entity | Dimension |
|---|---|---|---|---|
| 410A | Context ID: Jan2010-Commercial | Period: 1/1/2010 | Entity: Airco | Division: Commercial |
| 410B | Context ID: Jan2010-Passenger | Period: 1/1/2010 | Entity: Airco | Division: Passenger |
| 410C | Context ID: May2010 | Period: 5/1/2010 | Entity: Airco | |
| 410D | Context ID: Jan2010 | Period: 1/1/2010 | Entity: Airco | |
| 410E | Context ID: Jan2010-US | Period: 1/1/2010 | Entity: Airco | Region: US |

XBRL DIMENSIONS:MEMBERS

*Fig. 4*

```
1005A → <us-gaap:CommonStockSharesOutstanding contextRef="eol_PE2035---
            -1010-Q0017_STD_0_20100925_0" decimals="INF" unitRef=
            "shares">915970050</us-gaap:CommonStockSharesOutstanding>
1005B → <us-gaap:CommonStockSharesOutstanding contextRef="eol_PE2035---
            -1010-Q0017_STD_0_20101225_0" decimals="INF" unitRef=
            "shares">921035475</us-gaap:CommonStockSharesOutstanding>
1005C → <us-gaap:CommonStockSharesIssued contextRef="eol_PE2035----
            1010-Q0017_STD_0_20101225_0" decimals="INF" unitRef=
            "shares">921035475</us-gaap:CommonStockSharesIssued>
1005D → <us-gaap:CommonStockSharesIssued contextRef="eol_PE2035----
            1010-Q0017_STD_0_20100925_0" decimals="INF" unitRef=
            "shares">915970050</us-gaap:CommonStockSharesIssued>
1005E → <us-gaap:CommonStockSharesAuthorized contextRef="eol_PE2035----
            1010-Q0017_STD_0_20101225_0" decimals="INF" unitRef=
            "shares">1800000000</us-gaap:CommonStockSharesAuthorized>
1005F → <us-gaap:CommonStockSharesAuthorized contextRef="eol_PE2035----
            1010-Q0017_STD_0_20100925_0" decimals="INF" unitRef=
            "shares">1800000000</us-gaap:CommonStockSharesAuthorized>
1005G → <us-gaap:CommonStockNoParValue contextRef="eol_PE2035----1010-
            Q0017_STD_0_20100925_0" decimals="0" unitRef=
            "iso4217_USD_per_shares">0</us-gaap:CommonStockNoParValue>
1005H → <us-gaap:CommonStockNoParValue contextRef="eol_PE2035----1010-
            Q0017_STD_0_20101225_0" decimals="0" unitRef=
            "iso4217_USD_per_shares">0</us-gaap:CommonStockNoParValue>
1005I → <us-gaap:AllowanceForDoubtfulAccountsReceivableCurrent
            contextRef="eol_PE2035----1010-Q0017_STD_0_20101225_0"
            decimals="-6" unitRef="iso4217_USD">62000000</us-
            gaap:AllowanceForDoubtfulAccountsReceivableCurrent>
1005J → <us-gaap:AllowanceForDoubtfulAccountsReceivableCurrent
            contextRef="eol_PE2035----1010-Q0017_STD_0_20100925_0"
            decimals="-6" unitRef="iso4217_USD">55000000</us-
            gaap:AllowanceForDoubtfulAccountsReceivableCurrent>
```

| Entity | Period | dei:LegalEntityAxis | Concept | Value | Unit |
|---|---|---|---|---|---|
| http://www.sec.gov/CIK 0000320 | 2010-09-25 | dei:EntityDomain | us-gaap:CommonStockSharesOutstanding | 915970050 | xbrli:shares |
| http://www.sec.gov/CIK 0000320 | 2010-12-25 | dei:EntityDomain | us-gaap:CommonStockSharesOutstanding | 921035475 | xbrli:shares |
| http://www.sec.gov/CIK 0000320 | 2010-12-25 | dei:EntityDomain | us-gaap:CommonStockSharesIssued | 921035475 | xbrli:shares |
| http://www.sec.gov/CIK 0000320 | 2010-09-25 | dei:EntityDomain | us-gaap:CommonStockSharesIssued | 915970050 | xbrli:shares |
| http://www.sec.gov/CIK 0000320 | 2010-12-25 | dei:EntityDomain | us-gaap:CommonStockSharesAuthorized | 1800000000 | xbrli:shares |
| http://www.sec.gov/CIK 0000320 | 2010-09-25 | dei:EntityDomain | us-gaap:CommonStockSharesAuthorized | 1800000000 | xbrli:shares |
| http://www.sec.gov/CIK 0000320 | 2010-12-25 | dei:EntityDomain | us-gaap:CommonStockNoParValue | 0 | |
| http://www.sec.gov/CIK 0000320 | 2010-09-25 | dei:EntityDomain | us-gaap:CommonStockNoParValue | 0 | |
| http://www.sec.gov/CIK 0000320 | 2010-12-25 | dei:EntityDomain | us-gaap:AllowanceForDoubtfulAccountsReceivableCurrent | 62000000 | iso4217:USD |
| http://www.sec.gov/CIK 0000320 | 2010-09-25 | dei:EntityDomain | us-gaap:AllowanceForDoubtfulAccountsReceivableCurrent | 55000000 | iso4217:USD |

XBRL FLAT TABLE MAPPING SYSTEM AND METHOD

CROSS-REFERENCE TO RELATED APPLICATIONS

This application claims the benefit of priority to U.S. Provisional Application No. 61/453,840, filed Mar. 17, 2011, titled "XBRL FLAT TABLE MAPPING SYSTEM AND METHOD," and naming inventors Cliff Binstock and Brian Milnes. This application also claims the benefit of priority to U.S. Provisional Application No. 61/453,833, filed Mar. 17, 2011, titled "XBRL VIEWER SYSTEM AND METHOD," and naming inventors Cliff Binstock, Brian Milnes, and Sven Woermann. The above-cited applications are incorporated herein by reference in their entireties, for all purposes.

FIELD

The present disclosure relates to eXtensible Business Reporting Language ("XBRL"), and more particularly to systems and methods for processing, presenting, and/or mapping XBRL data to a set of flat tables, where each table represents a projection of a single hypercube.

BACKGROUND

XBRL is an open data standard for financial reporting. XBRL allows information modeling and the expression of semantic meaning commonly required in business reporting. XBRL uses Extensible Markup Language ("XML") syntax. XBRL is commonly used to define and exchange financial information, such as financial statements, corporate action filings, and the like. In the United States, the Securities and Exchange Commission ("SEC") requires certain entities to provide financial statements and other filings using XBRL.

In typical usage, XBRL consists of an instance document, containing primarily the business facts being reported, and one or more taxonomies, which capture definitions of individual reporting concepts, certain relationships between concepts, and other semantic meaning.

For example, the US Financial Reporting Taxonomy Framework ("USFRTF") is a collection of XBRL taxonomies that can be used to express the financial-statement-based reports of public and private companies across various industry sectors.

In addition, USFRTF includes several industry-layer taxonomies, including the us-gaap-ci taxonomy (commercial and industrial companies), us-gaap-basi (banking and savings institutions), us-gaap-ins (insurance entities), and the like. Such industry-layer taxonomies allow entities in particular industry categories to express industry-appropriate financial statements in XBRL.

USFRTF industry-layer taxonomies define various extended link "networks" containing concepts that make up various standard reports or forms. For example, the us-gaap-ci taxonomy includes, inter alia, a Statement of Financial Position network, an Income Statement network, and a Statement of Cash Flows network, which respectively contain concepts that make up balance sheets, income statements, and statements of cash flows.

As discussed above, XBRL is extremely flexible, and almost every entity that uses XBRL for reporting is able to extend a standard taxonomy (e.g., the USFRTF) to customize it to suit that particular entity's needs. However, this flexibility and customization can make it difficult to view data encapsulated into an XBRL instance document.

BRIEF DESCRIPTION OF THE DRAWINGS

FIG. 4 illustrates data from an exemplary XBRL instance document, in accordance with one embodiment.

FIG. 10 illustrates a group of raw XBRL entries, such as may appear in an XBRL instance document, in accordance with one embodiment.

FIG. 11 illustrates an exemplary flat table presentation corresponding to the raw XBRL entries illustrated in FIG. 10, in accordance with one embodiment.

DESCRIPTION

Figure 1:
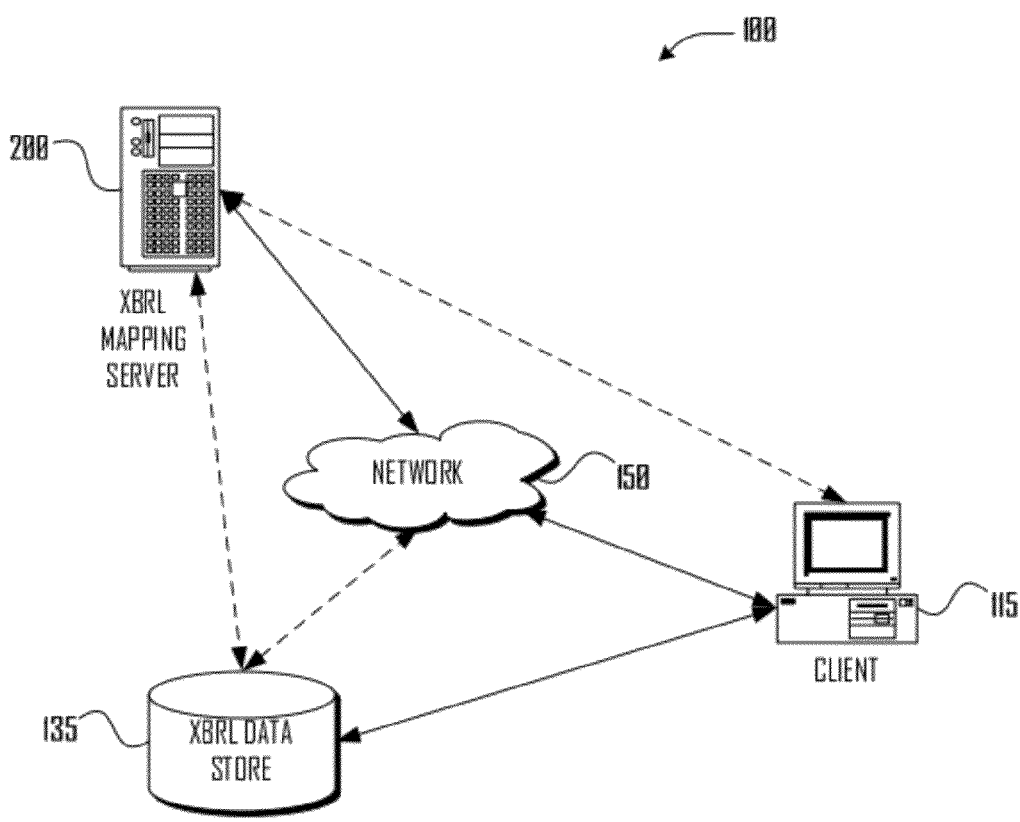
FIG. 1 illustrates an exemplary XBRL processing system in accordance with one embodiment.

Various embodiments may provide methods for automatically mapping XBRL data to an automatically generated flat table for presentation.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates an exemplary XBRL processing system 100 in which a client device 115 and an XBRL mapping server 200 are connected to a network 150. Additionally, client device 115 is connected to an XBRL data store 135, either locally, via an optional connection to network 150, or via another connection (not shown). In some embodiments, XBRL mapping server 200 may also be connected to XBRL data store 135. In some embodiments, XBRL data store 135 may comprise a local and/or remote database; a local and/or remote storage medium connected via a storage area network ("SAN"), a high speed serial bus, and/or via other suitable communication technology; a local and/or remote business intelligence system; and the like. In some embodiments, some or all of XBRL mapping server 200, client device 115, and/or XBRL data store 135 may be incorporated into a single logical or physical device.

In various embodiments, network 150 may include the Internet, a local area network ("LAN"), a wide area network ("WAN"), and/or other data network. In many embodiments, there may be multiple client devices 115, multiple XBRL data stores 135, and/or multiple XBRL mapping servers 200.

Figure 2:
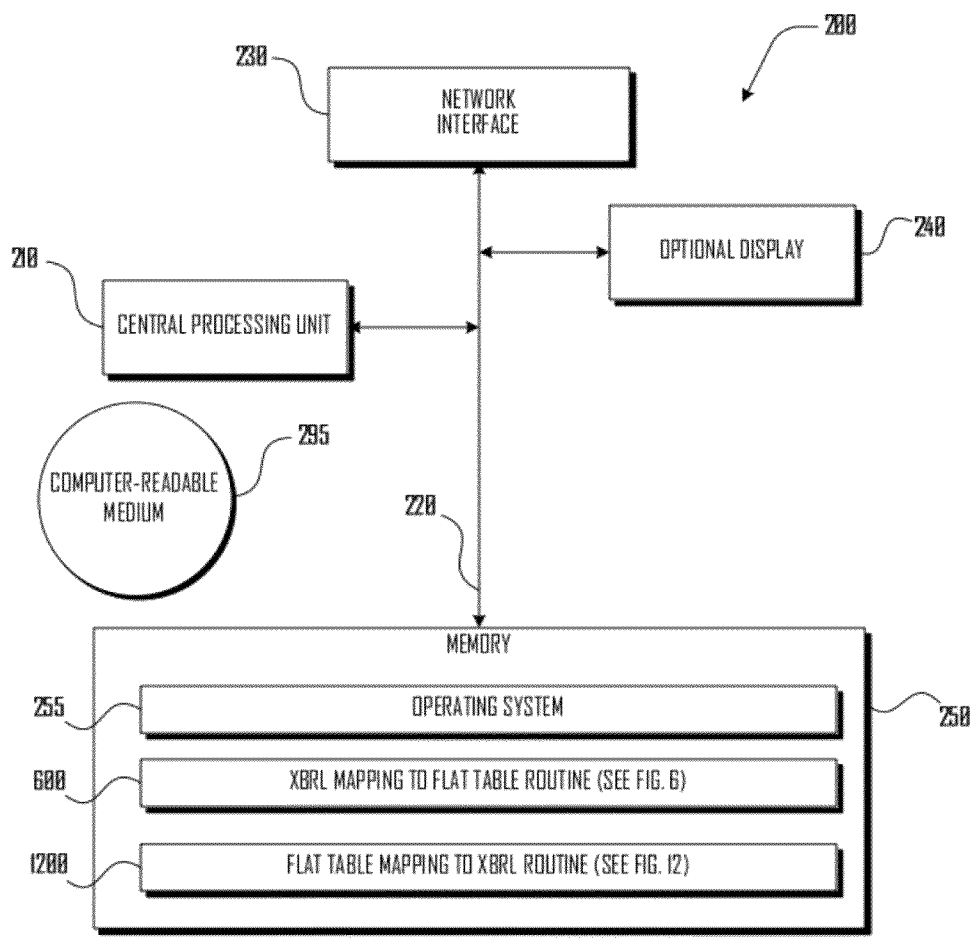
FIG. 2 illustrates several components of an exemplary XBRL mapping server in accordance with one embodiment.

FIG. 2 illustrates several components of an exemplary XBRL mapping server 200 in accordance with one embodiment. In some embodiments, XBRL mapping server 200 may include many more components than those shown in FIG. 2. However, it is not necessary that all of these generally conventional components be shown in order to disclose an illustrative embodiment. As shown in FIG. 2, the XBRL mapping server 200 includes a communication interface 205 for connecting to, e.g., the network 150.

The XBRL mapping server 200 also includes a processing unit 210, a memory 250, and an optional display 240, all interconnected along with the communication interface 205 via a bus 220. The memory 250 generally comprises a random access memory ("RAM"), a read only memory ("ROM"), and a permanent mass storage device, such as a disk drive. The memory 250 stores program code for a XBRL mapping to flat table routine 600 (see FIG. 6, discussed below), and a flat table mapping to XBRL routine 1200 (see FIG. 12, discussed below). In addition, the memory 250 also stores an operating system 255. These software components may be loaded from a computer readable storage medium 295 into memory 250 of the XBRL mapping server 200 using a drive mechanism (not shown) associated with a computer readable storage medium, such as a floppy disc, tape, DVD/CD-ROM drive, memory card, or the like. In some embodiments, software components may also be loaded via the communication interface 205, rather than via a computer readable storage medium 295.

Although an exemplary XBRL mapping server 200 has been described that generally conforms to conventional general purpose computing devices, an XBRL mapping server 200 may be any of a great number of devices capable of communicating with the network 150 and/or client device 115, for example, a personal computer, a game console, a set-top box, a handheld computer, a cell phone, or any other device that is capable of processing XBRL data.

Figure 3:
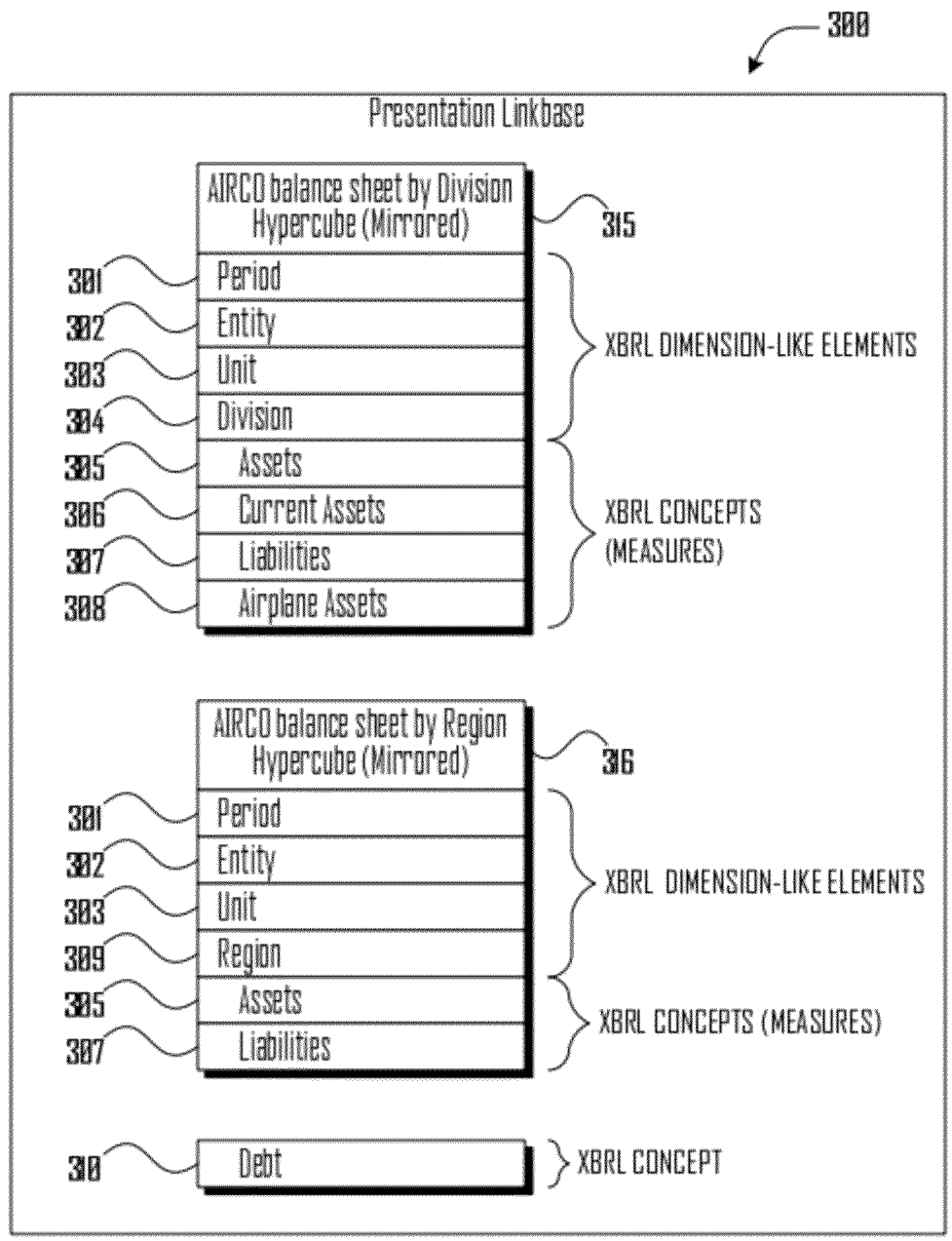
FIG. 3 illustrates elements comprising an exemplary XBRL hypercube in accordance with one embodiment.

FIG. 3 illustrates elements comprising an exemplary XBRL presentation linkbase 300 that will be used to illustrate various features and processes set out below. Presentation linkbase 300 describes relationships among a plurality of XBRL concepts, including those attached to hypercubes 315-316. Typically, presentation linkbase 300 is one linkbase within a XBRL network (not shown) comprising other linkbases, such as a calculation linkbase (not shown) and/or a definition linkbase (not shown) defining one or more structures called "hypercubes", which specify one or more XBRL dimensions used to structure contextual information for business facts associated with certain concepts that are specified as being "measures" of the hypercube.

As the term is used herein, the term XBRL "dimension" refers to a dimensional entity formally defined according to the XBRL Dimensions 1.0 Specification, or a similar, subsequently-developed specification. The term "dimension-like XBRL element" refers expansively not only to "proper" dimensions defined according to the XBRL Dimensions Specification, but also to various "built-in" context and unit elements (e.g., period or date, entity, and unit of currency) defined by the XBRL 2.1 specification (or a similar, subsequently developed specification), but that are not technically referred to as XBRL "dimensions". However, such built-in context and unit elements are considered to be functionally equivalent to "proper" XBRL dimensions and are included within the scope of the term "dimension-like XBRL element" as used in the present disclosure. As used herein, the term XBRL "dimension" also encompasses typed (non-enumerable) and explicit (enumerable) dimensions, and the term "dimension-like XBRL element" also encompasses tuples (elements holding multiple values, represented by a single XML element containing nested items or other tuples.)

The "built-in" dimension-like elements (period or date, entity, and unit of currency), discussed above, are also referred to herein as being "ubiquitous" among XBRL data, insofar as any fact structured according to any XBRL taxonomy can be associated with such "built-in" context and unit elements. By contrast, "non-ubiquitous" dimension-like XBRL elements include all other "proper" dimensions and dimension-like elements Still referring to FIG. 3, hypercube 315 includes dimension-like XBRL elements 301-304 and concepts 305-308 that make up a simplified balance sheet by division. Specifically, hypercube 315 includes XBRL dimension-like XBRL elements (including ubiquitous dimension-like XBRL elements, date 301, entity 302, and unit 303; as well as the non-ubiquitous dimension, division 304), which are associated with XBRL measures or primary items (assets 305, current assets 306, liabilities 307, and airplane assets 308).

Similarly, hypercube 316 includes dimension-like XBRL elements 301-303 and 309, and concepts 305 and 307 that make up a simplified balance sheet by region. Specifically, hypercube 316 includes XBRL dimension-like XBRL elements (including ubiquitous dimension-like XBRL elements, date 301, entity 302, and unit 303; as well as the non-ubiquitous dimension, region 309), which are associated with XBRL measures or primary items (assets 305 and liabilities 307).

Although hypercubes (e.g., hypercubes 315-316 are formally defined by a definition linkbase (not shown), it is common for presentation linkbases (e.g., presentation linkbase 300) to describe dimensions and concepts in a way that structurally similar to the formal definition-linkbase definition of a hypercube. As described herein, such presentation linkbases are said to "mirror" the formal hypercube definition.

Presentation linkbase also describes XBRL concept 310 (Debt), which is not explicitly associated with a hypercube. In many taxonomies, there exist similar concepts (potential measures or primary items) with zero "proper" dimensions, including concepts that are explicitly or implicitly attached to empty hypercubes (hypercubes with no "proper" dimensions). However, in various embodiments, as discussed below, even empty hypercubes are deemed to have at least the ubiquitous dimension-like XBRL elements (period or date, entity, and unit of currency) defined in the XBRL 2.1 specification. Thus, various embodiments may handle XBRL elements that lack literal or technical dimensions by treating concepts that are defined outside of hypercubes as being attached to empty hypercubes, and by treating empty hypercubes as having dimension-like XBRL elements corresponding to at least the ubiquitous "built-in" context and unit elements.

FIG. 4 illustrates data from an exemplary XBRL instance document 400 structured according to presentation linkbase 300, in accordance with one embodiment. Contexts 410A-E define named combinations of XBRL dimension:member pairs. In the exemplary data, the "division" dimension has valid enumerated values of "commercial," "passenger," and "all," "all" being the default value, which applies implicitly if no division is explicitly specified. For example, context January 2010-Commercial 410A defines a combination of [period:Jan. 1, 2010; entity:AirCo; division:commercial]. Similarly, context January 2010-Passenger 410B defines a combination of [period:Jan. 1, 2010; entity:AirCo; division:passenger]. Context January 2010-Airplane 410C and January2010 410D both define a combination of [period:Jan. 1, 2010; entity:AirCo; division:all (implicit)]. Not all dimensions necessarily have a default member. Context 410E defined a combination of [period:Jan. 1, 2010; entity:AirCo; region:US]

The exemplary data, discussed above, includes several "explicit" dimensions (i.e., dimensions that have a set of enumerated members). However, some XBRL instance documents may also include values for "typed" dimensions, which have unbounded or non-enumerable values (e.g., an alphanumeric CustomerID). Such "typed" dimensions are not, strictly speaking, associated with particular "members." Rather, "typed" dimensions are, strictly speaking, associated with particular "values." Nonetheless, the terms "dimension:member," "dimension:member pair," and the like, are used expansively herein to refer not only to literal dimension:member pairs (for explicit dimensions), but also to dimension:value pairs (for typed dimensions). In addition, as discussed below, the terms "dimension:member," "dimension:member pair," and the like, as used herein, also include tuple:index pairs.

Measure:fact pairs 415A-J are each associated with a specified combination of XBRL dimension:member pairs, including XBRL dimension:member pairs defined by one of contexts 410A-E plus a specified "unit" dimension. Thus, current assets:35 billion (415A) is associated with the dimension:member combination of [period:Jan. 1, 2010; entity:AirCo; division:all (implicit); unit:USD]. Current assets:20 billion (415B) is associated with the combination of [period:Apr. 1 2010; entity:AirCo; division:all (implicit); unit:USD]. Measure:fact pairs 415C-J are similarly associated with the indicated dimension:member combinations.

Figure 5:
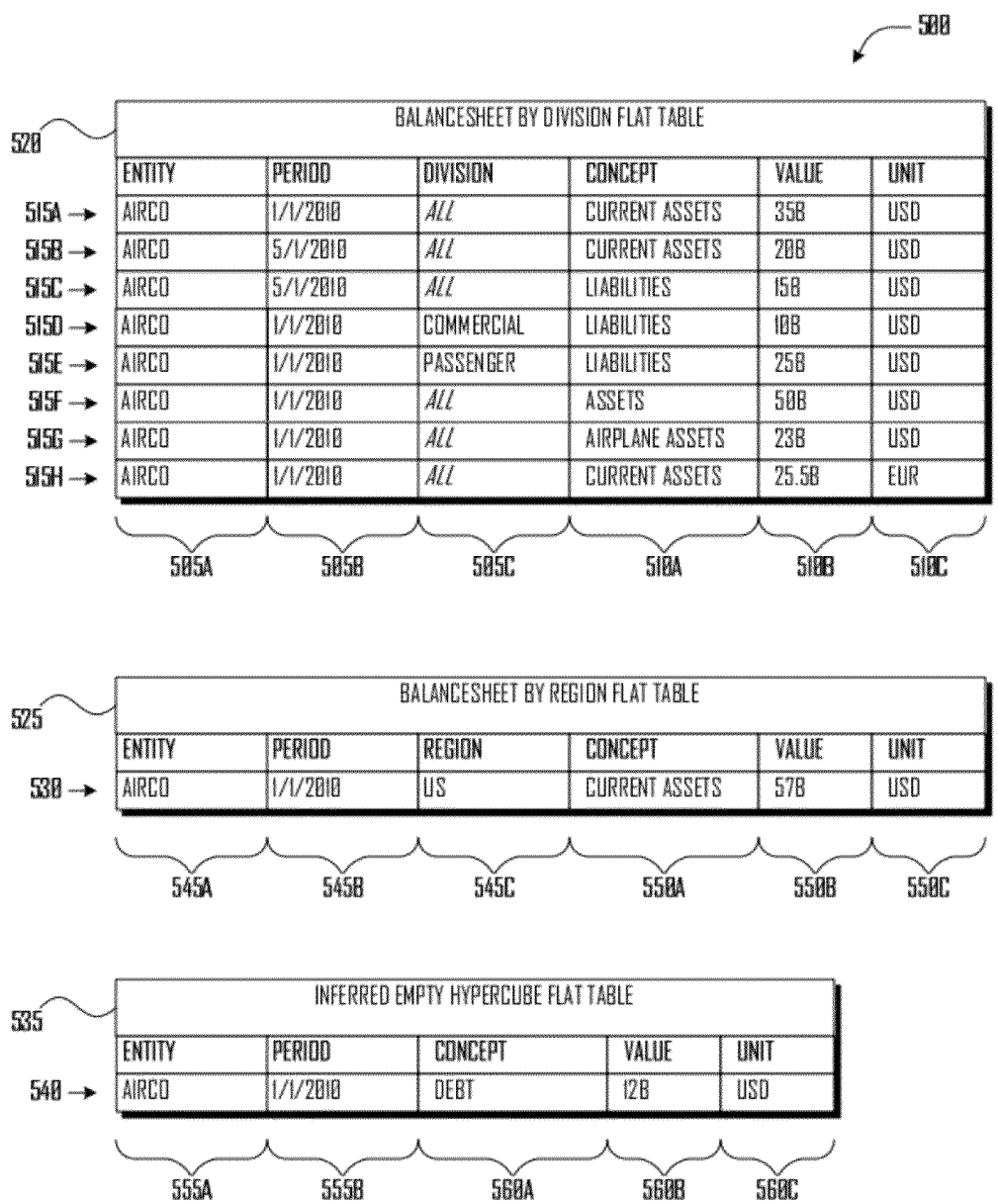
FIG. 5 illustrates a set of "flat tables" derived from the exemplary XBRL instance document illustrated in FIG. 4, in accordance with one embodiment.

FIG. 5 illustrates a set of "flat tables" 520, 525, 535 derived from exemplary XBRL instance document 400, in accordance with one embodiment. Flat table 520 corresponds to hypercube 315 and shows ubiquitous-dimension columns 505A-B and 510C, non-ubiquitous-dimension column 505C, concept column 510A, and value column 510B. Rows 515A-H correspond to measure:fact pairs 415A-H, as shown in FIG. 4. Similarly, flat table 525 corresponds to hypercube 316 and shows ubiquitous-dimension columns 545A-B and 550C, non-ubiquitous-dimension column 545C, concept column 550A, and value column 550B. Row 530 corresponds to measure:fact pair 415I, as shown in FIG. 4. Flat table 535 corresponds to an implicit empty hypercube and shows ubiquitous-dimension columns 555A-B and 560C, concept column 560A, and value column 560B. Row 540 corresponds to measure:fact pair 415J, as shown in FIG. 4.

Figure 6:
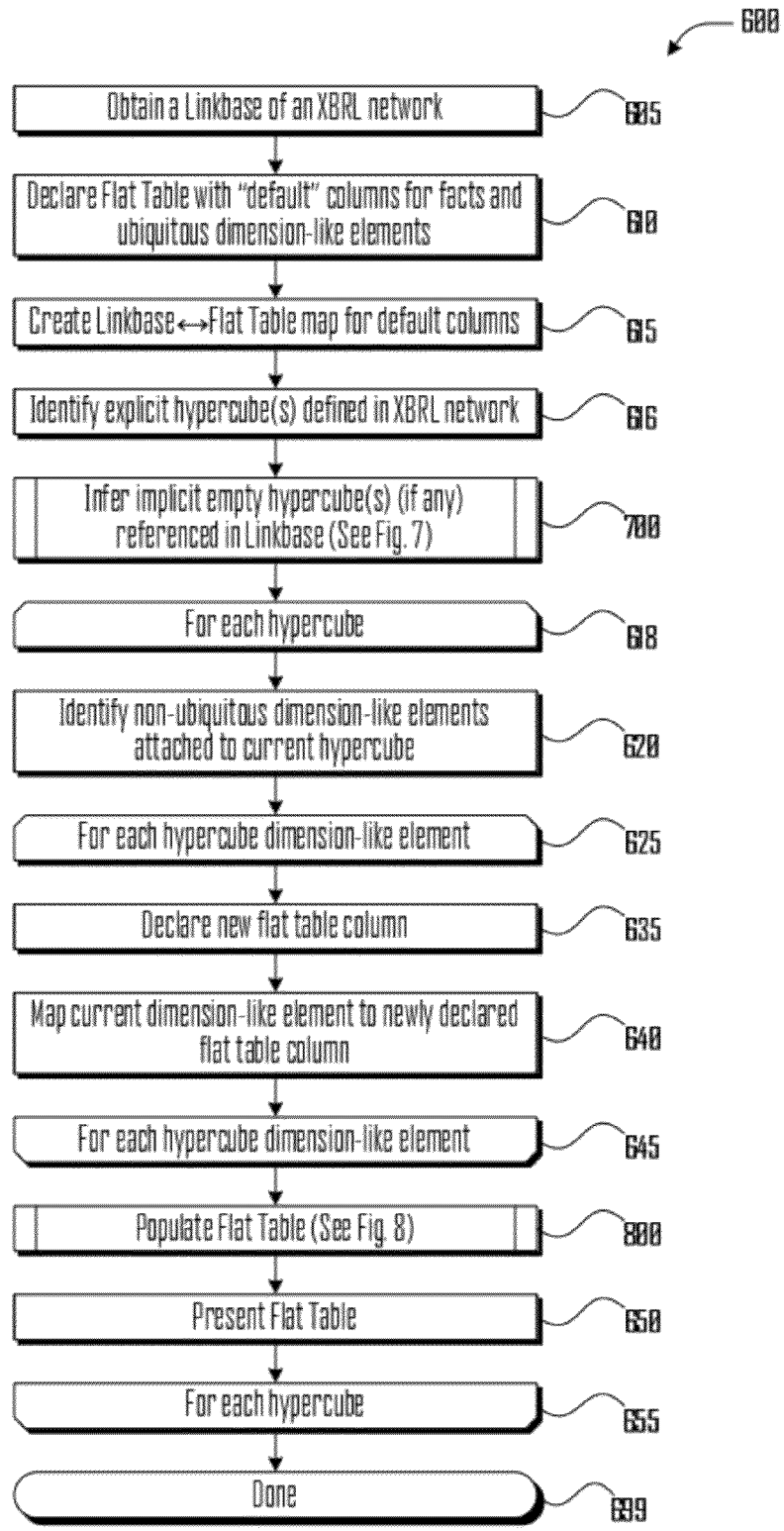
FIG. 6 illustrates a routine for mapping a given XBRL linkbase to one or more flat tables, in accordance with one embodiment.

FIG. 6 illustrates a routine 600 for mapping a given XBRL linkbase (e.g. linkbase 300), which is part of a given XBRL network, to one or more flat tables (e.g., flat tables 520, 525, 535), such as may be performed by XBRL mapping server 200 in accordance with one embodiment. Generally, routine 600 may also be able to access other linkbases that are part of the same XBRL network, as needed. In some embodiments, routine 600 may be performed multiple times, when processing various networks grouped together, for example, into a filing with the United States Securities and Exchange Commission ("SEC").

In block 605, routine 600 obtains a given XBRL linkbase (e.g. linkbase 300), which is part of a given XBRL network. For explanatory purposes, routine 600 will be assumed to obtain linkbase 300.

In block 610, routine 600 "declares" or initializes a flat table or "tabular" data structure initially having a number of "default" columns. For example, in one embodiment, the initialized flat table data structure may have by default a concept column (e.g. 510A, 550A, 560A) for concepts (more specifically, qualified names or "QNames" of concepts), a value column (e.g., 510B, 550B, 560B) for fact values, and one or more columns for ubiquitous dimension-like elements, including a unit-of-currency column (e.g., 510C, 550C, 560C), an entity column (e.g., 505A, 545A, 555A), and a period-of-time column (e.g., 505B, 545B, 555B). Other embodiments may use other default columns, including one or more columns such as a prefix column for concept prefixes, a namespace column for concept namespaces, a local name column for concept local names, and the like. In various embodiments, the flat table data structure may comprise at various times a list, array, hash, XML data, HyperText Markup Language ("HTML") data, or a similar structure stored in transient or persistent memory, one or more database tables, or other like data structure.

In block 615, routine 600 creates a linkbase-*flat table map for storing mappings between the XBRL linkbase and the flat table declared in block 610. In some embodiments, the default map includes mappings for the default columns discussed above in relation to block 610. For example, in one embodiment, the default map may include default mappings including some or all of the following:
 a unit-of-currency ubiquitous dimension-like element (e.g., element 303) may be mapped to a unit column (e.g., column 510C, 550C, or 560C);
 QNames of measures, concepts, or primary items (e.g., 305-308, 310) may be mapped to a concept column (e.g. column 510A, 550A, or 560A);
 Fact values may be mapped to a value column (e.g., column 510B, 550B, or 560B);
 an entity ubiquitous dimension-like element (e.g., entity 302) may be mapped to an entity column (e.g., column 505A, 545A, or 555A);
 a period ubiquitous dimension-like element (e.g., 301) may be mapped to a period column (e.g., column 505B, 545B, or 555B).

In various embodiments, the map may comprise at various times a list, array, hash, XML data, or similar structure stored in transient or persistent memory; one or more database tables; or other like data structure.

In block 616, routine 600 identified one or more hypercubes (e.g., hypercubes 315-316) that are explicitly defined in the XBRL network (either defined in the given linkbase itself or in a definition or other linkbase associated with the network).

In subroutine block 700, routine 600 uses subroutine 700 (see FIG. 7, discussed below) to infer zero or more implicit empty hypercubes referenced in the given linkbase. For example, in one embodiment, routine 600 may infer an empty hypercube associated with concept 310.

Beginning in opening loop block 618, routine 600 processes each hypercube (explicit and implicit) identified or inferred in blocks 616 and 700.

In block 620, routine 600 identifies one or more non-ubiquitous dimension-like elements defined in the current hypercube. For example, when processing hypercubes 315 or 316, routine 600 may identify dimension 304 or dimension 309, respectively.

In some embodiments, one or more of such non-ubiquitous dimension-like elements may be derived from tuples. For example, the XBRL network may, in come cases, include one or more tuples, as shown in Table 1.

TABLE 1

Examplary tuple

```
<department>
    <director>
        <directorName context=Jan2010>Binstock</directorName>
    </director>
    <director>
        <directorName context=Jan2010>Milnes</directorName>
    </director>
</department>
```

Multiple departments could be instantiated in a given network, each with multiple directors.

The example tuple data includes a top-level tuple ("department"), which encloses two nested "director" tuples, which respectively include the measure:fact pairs directorName:Binstock and directorName:Milnes.

Both measure:fact pairs are associated with the January 2010 context. As discussed above, the January 2010 context defines a combination of [period:Jan. 1, 2010; entity:AirCo; division:all (implicit)]. However, when a fact is included in a tuple, the fact's context also includes dimension:member pairs (where both "dimension" and "member" are used expansively) corresponding to each enclosing tuple. Specifically, in one embodiment, the tuple's tag or "QName" (e.g., "department" or "director") is paired with an index derived from each enclosing tuple's position within its parent element.

For example, assuming that the tuple with the tag of "department" (above) were the first tuple with that tag to appear in its enclosing instance document, then that tuple may be assigned an index of, for example, "1" (although index numbering could also start with "0" or any other number). In other embodiments, rather than assigning an index to each tuple, some other arbitrary identifier may be generated or derived for each tuple.

Thus, the directorName:Binstock measure:fact would be associated in one embodiment with the following dimension:member combination: [period:Jan. 1, 2010; entity:AirCo; division:all (implicit); director:1; department:1]. Similarly, the directorName:Milnes measure:fact would be associated in one embodiment with the following dimension:member combination: [period:Jan. 1, 2010; entity:AirCo; division:all (implicit); director:2; department:1]. In such embodiments, the tuple:index pairs would be handled the same way as any other "dimension:member" pair (as those terms are expansively used herein).

Beginning in starting loop block 625, routine 600 processes each non-ubiquitous dimension-like element identified in block 620.

In block 635, routine 600 declares in the flat table data structure a non-ubiquitous-dimension column corresponding to the current non-ubiquitous dimension-like element. In some embodiments, the flat table column may be named according to a name, identifier, or descriptor associated with the current non-ubiquitous dimension-like element.

In block 640, routine 600 adds a map entry mapping the current non-ubiquitous dimension-like element to the newly declared non-ubiquitous-dimension column in the flat table data structure. For example, in one embodiment, routine 600 may add a mapping indicating that dimension 304 maps to column 505C, or that dimension 309 maps to column 545C, or the like.

In ending block 645, routine 600 loops back to block 625 to process the next non-ubiquitous dimension-like element (if any).

In subroutine block 800 (see FIG. 8, discussed below), routine 600 populates the flat table data structure with facts and dimension-like element members/values/indices from an XBRL instance document associated with the XBRL network.

In block 650, routine 600 presents the populated flat table to a user. (See, e.g., FIG. 11, discussed below.) For example, in some embodiments, routine 600 may format the populated flat table into a format suitable for presentation to a remote viewer via network 150 (e.g., HTML; an Internet application platform format, such as Adobe Flex or Adobe Flash, both provided by Adobe Systems Incorporated of Mountain View, Calif.; or the like). In some embodiments, the flat table may be presented in editable form, with edits being mapped back to an XBRL instance document according to routine 1200, discussed below.

Routine 600 ends in block 699.

Figure 7:
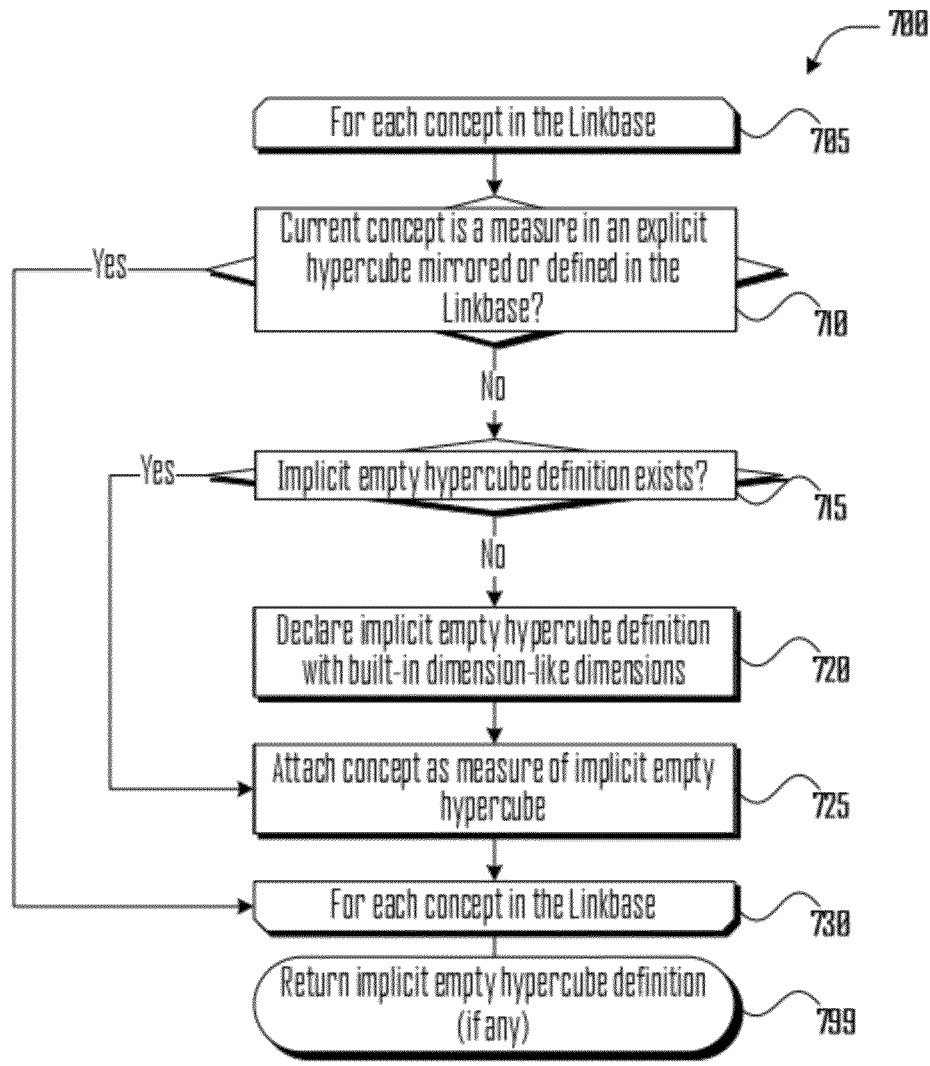
FIG. 7 illustrates a subroutine for inferring implicit empty hypercubes (if any) referenced in a given linkbase, in accordance with one embodiment.

FIG. 7 illustrates a subroutine 700 for inferring implicit empty hypercubes (if any) referenced in a given linkbase. Beginning in opening loop block 705, subroutine 700 iterates over each concept in the linkbase. For example, when processing linkbase 300, subroutine 700 may iterate over concepts 305-308 and 310.

In decision block 710, subroutine 700 determines whether the current concept is a measure in an explicitly-defined hypercube that is mirrored or defined in the given linkbase. If so, then subroutine 700 proceeds to ending loop block 730.

Otherwise, if the current concept is not a measure in an explicitly-defined hypercube that is mirrored or defined in the given linkbase, then in decision block 715, subroutine 700 determines whether it has previously declared an implicit empty hypercube definition. If not, then in block 720, subroutine 700 declares an implicit empty hypercube definition.

In block 725, subroutine 700 attached the current concept as a measure of the implicit empty hypercube. For example, when processing linkbase 300, subroutine 700 may declare an implicit empty hypercube and attach to it concept 310.

In ending loop block 730, subroutine 700 iterates back to block 705 to process the next concept (if any) in the given linkbase. Once all concepts have been processed, subroutine 700 ends in block 799, returning the implicit empty hypercube definition (if any).

Figure 8:
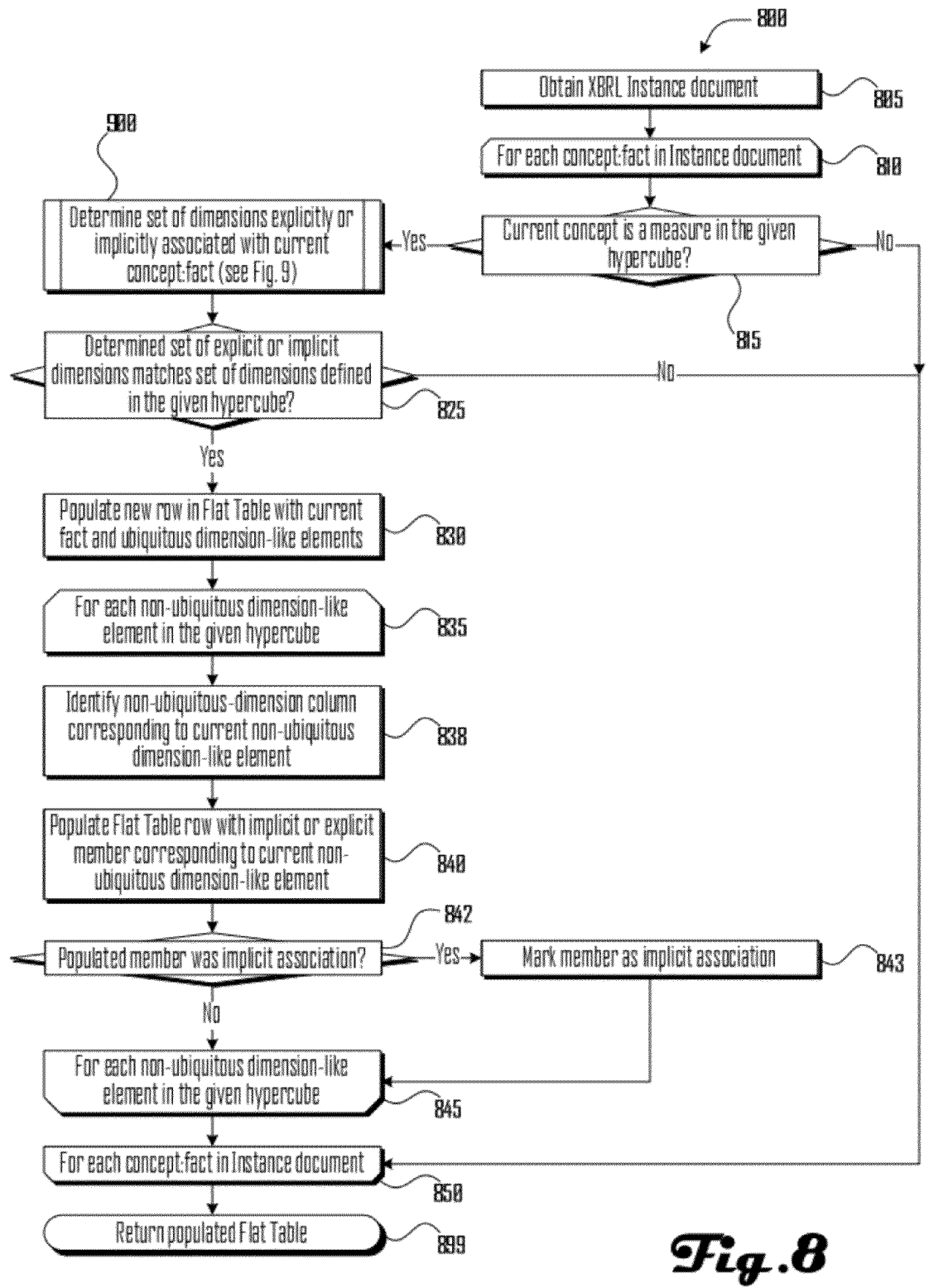
FIG. 8 illustrates a subroutine for populating a flat table data structure with facts and dimension-like element members from an XBRL instance document, in accordance with one embodiment.

FIG. 8 illustrates a subroutine 800 for populating a flat table data structure, associated with a given hypercube, with facts and dimension-like element members/values/indices from an XBRL instance document, in accordance with one embodiment. In block 805, subroutine 800 obtains an XBRL instance document associated with a given XBRL hypercube (which may have been explicitly defined, such as hypercubes 315-316, or implicitly defined, such as an implicit empty hypercube defined using subroutine 700, discussed above).

Beginning in starting loop block 810, subroutine 800 processes each XBRL concept:fact in the instance document (e.g. instance document 400).

In decision block 815, subroutine 800 determines whether the current concept is defined as a measure in the given hypercube. If not, then subroutine 800 proceeds to ending loop block 850.

Otherwise, when the current concept is defined as a measure in the given hypercube, then in subroutine block 900, subroutine 800 uses subroutine 900 (see FIG. 9, discussed below) to determine a set of non-ubiquitous dimension-like elements that are explicitly or implicitly associated with the current concept:fact.

In decision block 825, subroutine 800 determines whether the set of non-ubiquitous dimension-like elements associated with the current concept:fact (as determined in subroutine block 900) exactly matches the set of non-ubiquitous dimension-like elements associated with the given hypercube. If not, then subroutine 800 proceeds to ending loop block 850.

Otherwise, when the set of non-ubiquitous dimension-like elements associated with the current concept:fact exactly matches the set of non-ubiquitous dimension-like elements associated with the given hypercube, then in block 830, subroutine 800 creates a new row in the flat table data structure and populates the concept and value columns of the new row with the current concept and fact. In block 830, subroutine 800 further populates ubiquitous dimension columns with members associated with the current concept:fact.

Beginning in opening loop block 835, subroutine 800 processes each non-ubiquitous dimension-like element in the given hypercube. In block 838, subroutine 800 identifies (according to the map assembled in blocks 615 and 640, discussed above) a non-ubiquitous-dimension column of the new row (created in block 830) that is associated with the current non-ubiquitous dimension-like element.

For example, in one iteration of one embodiment, subroutine 800 may determine (according to the map assembled in blocks 615 and 640, discussed above) that the member/value/index associated with entity dimension 302 maps to entity column 505A. Similarly, in other iterations, subroutine 800 may determine that the member/value/index associated with period dimension 301 maps to period column 505B, that the measure associated with the current measure:fact maps to concept column 510A, that the fact associated with the current measure:fact maps to value column 510B, and so on.

In block 840, subroutine 800 populates the identified non-ubiquitous-dimension column of the row with a member/value/index associated with the current non-ubiquitous dimension-like element and the given concept:fact. For example, in various iterations of one embodiment, subroutine 800 may populate columns as follows:

the element "AirCo" may be populated into the entity column 505A of rows 515A-H;
the element "Commercial" may be populated into column 505C of row 515D;
the element 35 billion may be populated into column 510B of row 515A;
and so on.

In decision block 842, subroutine 800 determines whether the member/value/index populated in block 840 was implicitly associated with the current concept:fact (as determined in block 900, discussed above). If so, then in block 843, subroutine 800 makes the member/value/index identifiable as having been implicitly associated with the current concept:fact. For example, in one embodiment, when populating flat table 520, rows 515A-C and 515F-H may have been populated with implicitly associated members in column 505C. As illustrated in FIG. 5, these cells have been rendered in an italic font, thereby making the implicitly associated values identifiable. Other embodiments may use different visual indications to make the implicitly-associated members identifiable as such.

In closing loop block 845, subroutine 800 iterates back to block 835 to process the next non-ubiquitous dimension-like element (if any) in the given hypercube. In closing loop block 850, subroutine 800 iterates back to block 810 to process the next XBRL concept:fact (if any) in the instance document. Having populated all rows of the flat table, subroutine 800 ends in block 899, returning the populated flat table data structure to the caller.

Figure 9:
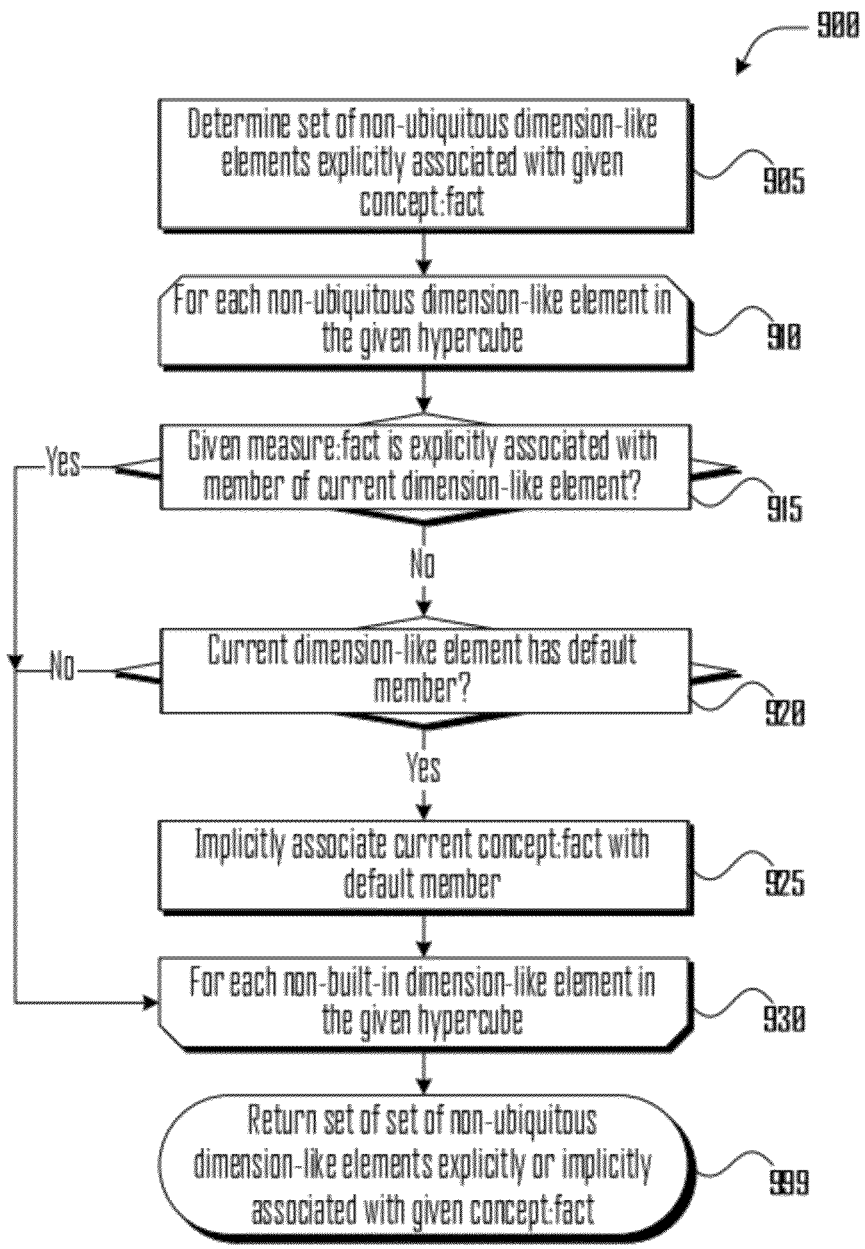
FIG. 9 illustrates a subroutine for determining a set of non-ubiquitous dimension-like elements of a given hypercube that are explicitly or implicitly associated with a given concept fact of a given XBRL instance document, in accordance with one embodiment.

FIG. 9 illustrates a subroutine 900 for determining a set of non-ubiquitous dimension-like elements of a given hypercube that are explicitly or implicitly associated with a given concept:fact of a given XBRL instance document, in accordance with one embodiment.

In block 905, subroutine 900 determines the set of non-ubiquitous dimension-like elements that are explicitly associated with a given concept:fact. For example, subroutine 900 may determine that the set of non-ubiquitous dimension-like elements that are explicitly associated with any of concepts:facts 415A-C, 415F-H, and 415J consists of the empty set, whereas the set associated with any of concept:facts 415D-E consists of the dimension "division", and the set associated with concept:fact 415I consists of the dimension "region".

Beginning in opening loop block 910, subroutine 900 processes each non-ubiquitous dimension-like element of the given hypercube. In decision block 915, subroutine 900 determines whether the given measure:fact is explicitly associated with a member of the current dimension-like element. If so, then subroutine 900 proceeds to closing loop block 930.

Otherwise, if the given measure:fact is not explicitly associated with a member of the current dimension-like element, then in decision block 920, subroutine 900 determines whether the current dimension-like element has a default member. If not, then subroutine 900 proceeds to closing loop block 930.

Otherwise, when the current dimension-like element has a default member, then in block 925, subroutine 900 implicitly associates the current concept:fact with the default member.

For example, when processing any of concepts:facts 415A-C and 415F-H in relation to dimension 304 ("division") of hypercube 315, subroutine 900 may, in block 925, implicitly associate the current concept:fact with the default member "all".

In closing loop block 930, subroutine 900 iterates back to block 910 to process the next non-ubiquitous dimension-like element (if any) of the given hypercube. Once all non-ubiquitous dimension-like elements of the given hypercube have been processed, subroutine 900 ends in block 999, returning the determined set of non-ubiquitous dimension-like elements that are explicitly or implicitly associated with the current concept:fact.

FIG. 10 illustrates a group of raw XBRL entries 1015A-J, such as may appear in an XBRL instance document, in accordance with one embodiment. In FIG. 10, the facts represented by entries 1015A-J have been set off in bold merely for illustrative purposes.

FIG. 11 illustrates an exemplary flat table presentation 1100, such as may have been generated (at least in part) by routine 600 using (in part) raw XBRL entries 1015A-J, in accordance with one embodiment. In various embodiments, presentation 1100 may be presented by XBRL mapping server 200 via network 150 to remote client 115 for viewing in a web browser.

FIG. 10 includes only a relatively small portion of the XBRL instance document from which entries 1015A-J were extracted. Consequently, FIG. 10 does not include sufficient data to derive flat table presentation 1100. Notably, entries 1015A-J do not directly show dimensions or members for flat table columns 1105A-C; such elements are defined elsewhere in the XBRL instance document from which entries 1015A-J were extracted.

Nonetheless, the instance document and XBRL network from which entries 1015A-J were extracted does include sufficient data to drive flat table presentation 1100. However, it is neither practical nor necessary to show the entire instance document and XBRL network in order to disclose an illustrative embodiment.

Using the data apparent from FIG. 10, it may be observed that raw XBRL entries 1015A-J correspond respectively to presentation entries 1115A-J. For example, columns 1110A-B of presentation row 1115A show, respectively, a concept and a value corresponding to XBRL elements of entry 1015A, specifically, the measure ("us-gaap:CommonStockSharesOutstanding") and fact ("915970050") from entry 1015A. Similar relationships between presentation rows 1115B-J and XBRL entries 1015 B-J may also be observed.

Presentation 1100 may be easily comprehended (compared to raw XBRL entries 1015A-J or other forms of XBRL presentation) by presenting XBRL data in a flat table according to one embodiment of the systems and methods described herein.

Figure 12:
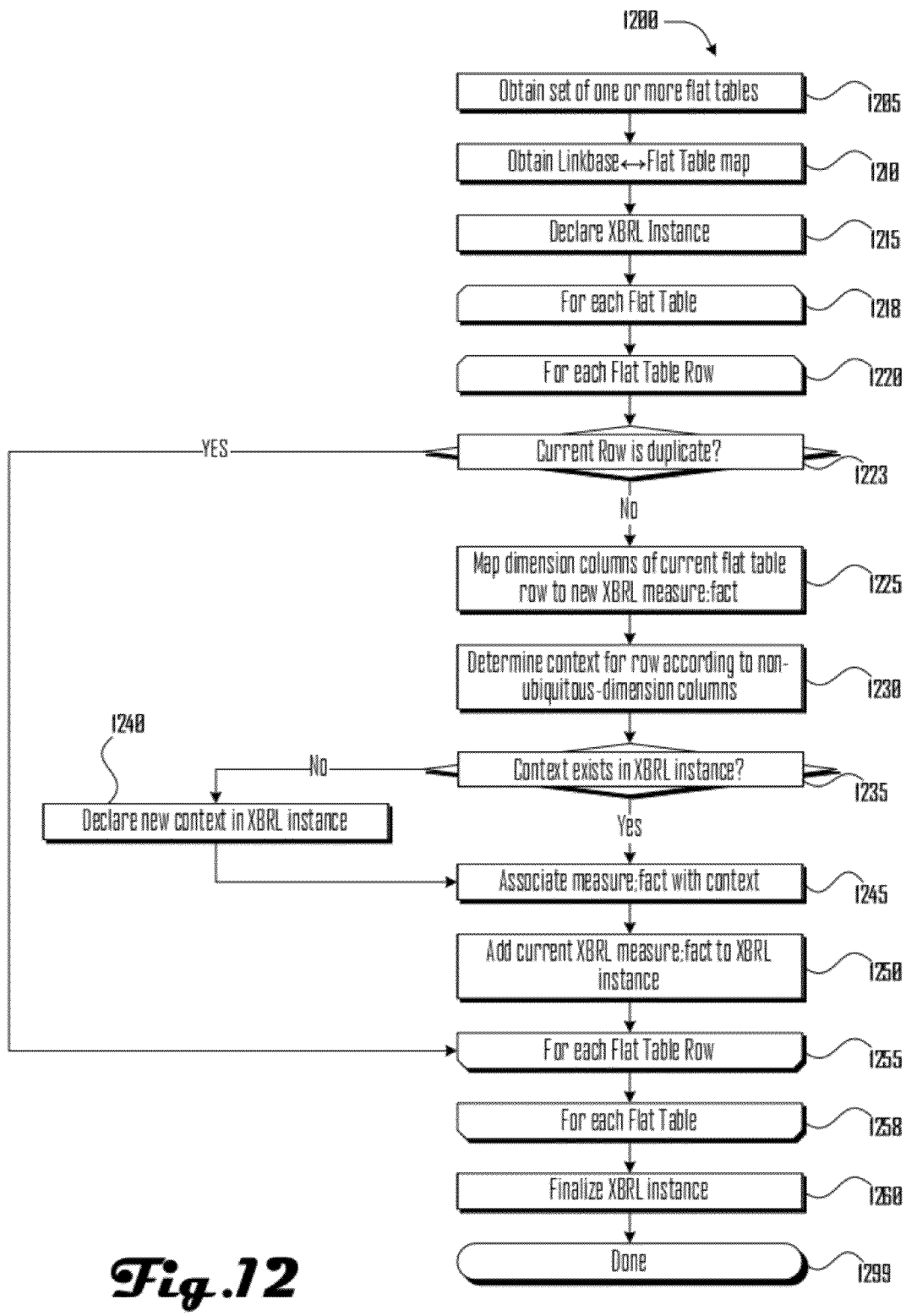
FIG. 12 illustrates a routine for mapping a set of flat tables to an XBRL instance document, in accordance with one embodiment.

FIG. 12 illustrates a routine 1200 for mapping a set of flat tables (e.g., flat tables 520, 525, and 535) to an XBRL instance document (e.g. instance document 400), such as may be performed by XBRL mapping server 200 in accordance with one embodiment. In some embodiments, routine 1200 may be performed when a flat table is used for editing values from an XBRL instance document.

In block 1205, routine 1200 obtains a set of one or more flat tables (e.g., flat tables 520, 525, and 535) that, in one embodiment, were generated according to routine 600 (discussed above). In block 1210, routine 1200 obtains a map data structure including mappings between an XBRL network and the set of flat tables. For example, in one embodiment, routine 1200 may obtain a map generated by routine 600 (discussed above). In block 1215, routine 1200 declares a new XBRL instance document that will be populated later in the routine.

Beginning in opening loop block 1218, routine 1200 processes each flat table of the set of one or more flat tables. Beginning in opening loop block 1220, routine 1200 processes each row in the current flat table. In decision block 1223, routine 1200 determines whether the current row is a semantic duplicate of a previously-processed row. In some cases, a row may be a semantic duplicate of another row if the XBRL instance from which the flat table was generated presented a single fact in two or more places. If the current row duplicates a previously-processed row, then routine 1200 skips to ending loop block 1255 to process the next row (if any).

However, if the current row is not a semantic duplicate of a previously-processed row, then in block 1225, routine 1200 maps appropriate dimension columns (both ubiquitous and non-ubiquitous, see discussion above in reference to block 615 of FIG. 6) in the current flat table row to a new XBRL measure:fact entry according to the map data structure obtained in block 1210.

In block 1230, routine 1200 maps each dimension column in the flat table to an XBRL dimension-like element according to the map data structure obtained in block 1210. Using the current row's values of the mapped dimensional columns, routine 1200 further determines a context for the current row. In some embodiments, the determined context may include a unit element, if appropriate. For example, in one embodiment, when processing row 515D, routine 1200 may determine a context including the following dimension-like elements, [period:Jan. 1 2010; entity:AirCo; division: commercial; unit:USD].

In decision block 1235, routine 1200 determines whether the context (determined in block 1230) already exists in the XBRL instance. If not, then in block 1240, routine 1200 adds the context to the XBRL instance document.

In block 1245, routine 1200 associates the context (determined in block 1230) with the XBRL measure:fact created in block 1225. Once the XBRL measure:fact has been associated with an appropriate context, then in block 1250, routine 1200 adds the measure:fact to the XBRL instance document declared in block 1215.

In ending loop block 1255, routine 1200 iterates back to block 1220 to process the next flat table row (if any). In ending loop block 1258, routine 1200 iterates back to block 1218 to process the next flat table (if any). Once the XBRL instance has been updated according to all flat table rows of all flat tables, routine 1200 finalizes the XBRL instance, storing it in transient or persistent memory for later use or processing. In some embodiments, notwithstanding any edits that may have been made to the data when presented as a flat table, the XBRL instance thus generated may be semantically (if not syntactically) identical to the original XBRL instance from which the flat table was generated.

Routine 1200 ends in block 1299.

Although specific embodiments have been illustrated and described herein, a whole variety of alternate and/or equivalent implementations may be substituted for the specific embodiments shown and described without departing from the scope of the present invention. This application is intended to cover any adaptations or variations of the embodiments discussed herein.

What is claimed is:

1. A computer-implemented method for mapping eXtensible Business Reporting Language ("XBRL") data to a flat table, the method comprising:

obtaining, by the computer, an XBRL linkbase describing relationships among a plurality of XBRL concepts;

identifying, by the computer, an XBRL hypercube to which at least some of said plurality of XBRL concepts are attached as XBRL measures;

identifying, by the computer, a ubiquitous dimension-like XBRL element associated with said XBRL hypercube and a set of one or more non-ubiquitous dimension-like XBRL elements defined in said XBRL hypercube, said ubiquitous dimension-like XBRL element being ubiquitous among XBRL-structured data;

initializing, by the computer, a tabular data structure including a value column for storing facts, a concept column for storing fact-associated concepts, a ubiquitous-dimension column, and one or more non-ubiquitous-dimension columns;

generating, by the computer, a data map mapping said XBRL measures of said XBRL hypercube to said concept column, mapping said ubiquitous dimension-like XBRL element of said XBRL hypercube to said ubiquitous-dimension column, and respectively mapping said set of one or more non-ubiquitous dimension-like XBRL elements of said XBRL hypercube to said one or more non-ubiquitous-dimension columns;

storing said data map and said tabular data structure;

obtaining XBRL instance data comprising a plurality of facts and associated metadata;

using said data map, selecting from said XBRL instance data a plurality of hypercube-attached facts that are respectively associated with any one of said plurality of XBRL measures and that are explicitly or implicitly associated with exactly said set of one or more non-ubiquitous dimension-like XBRL elements;

using said data map, populating said tabular data structure with a plurality of rows corresponding respectively to said plurality of hypercube-attached facts; and providing said populated tabular data structure for display to a user.

2. The method of claim 1, wherein populating said tabular data structure comprises, for each of said plurality of hypercube-attached facts:

adding a row to said tabular data structure;

populating said value column of said added row with a current hypercube-attached fact;

determining a fact-associated measure of said plurality of XBRL measures as being associated with said current hypercube-attached fact;

populating said concept column of said added row with said fact-associated measure;

determining a fact-associated ubiquitous metadata value that is associated with said current hypercube-attached fact and that corresponds to said ubiquitous dimension-like XBRL element;

using said data map, populating said ubiquitous-dimension column with said fact-associated ubiquitous metadata value;

determining one or more fact-associated non-ubiquitous metadata values that are associated with said current hypercube-attached fact and that respectively correspond to said set of one or more non-ubiquitous dimension-like XBRL elements;

using said data map, respectively populating said one or more non-ubiquitous-dimension columns with said one or more fact-associated non-ubiquitous metadata values.

3. The method of claim 2, wherein determining said one or more fact-associated non-ubiquitous metadata values comprises:

determining that said XBRL instance data does not explicitly associate said current hypercube-attached fact with a metadata value corresponding to at least one of said set of one or more non-ubiquitous dimension-like XBRL elements;

obtaining a hypercube definition defining said XBRL hypercube, said hypercube definition including a default value corresponding to said at least one of said set of one or more non-ubiquitous dimension-like XBRL elements; and implicitly associating said default value with said current hypercube-attached fact.

4. The method of claim 3, wherein providing said populated tabular data structure for display to said user comprises making said default value identifiable as having been implicitly associated with said current hypercube-attached fact.

5. The method of claim 1, further comprising:

identifying among said plurality of XBRL concepts a plurality of implicitly-attached concepts that are implicitly attached to an implicit empty hypercube that is associated with said ubiquitous dimension-like XBRL element;

initializing a second tabular data structure including a second value column, a second concept column, and a second ubiquitous-dimension column; and updating said data map to further map said plurality of implicit measures of said implicit empty hypercube to said second concept column, and to further map said ubiquitous dimension-like XBRL element of said implicit empty hypercube to said second ubiquitous-dimension column.

6. The method of claim 5, further comprising:

selecting from said XBRL instance data a plurality of implicitly-attached facts that are respectively associated with any one of said plurality of implicit measures;

using said data map, populating said second tabular data structure with a plurality of rows corresponding respectively to said plurality of implicitly-attached facts; and providing said populated second tabular data structure for display to a user.

7. The method of claim 6, wherein populating said second tabular data structure comprises, for each of said plurality of implicitly-attached facts:

adding a row to said second tabular data structure;

populating said second value column of said added row with a current implicitly-attached fact;

determining a fact-associated implicit measure of said plurality of implicit measures as being associated with said current implicitly-attached fact;

populating said second concept column of said added row with said fact-associated implicit measure; and determining a fact-associated ubiquitous metadata value that is associated with said current implicitly-attached fact and that corresponds to said ubiquitous dimension-like XBRL element.

8. The method of claim 5, wherein identifying said plurality of implicitly-attached concepts comprises:

identifying a set of explicit XBRL hypercubes, including said XBRL hypercube, to which any of said plurality of XBRL concepts are attached as XBRL measures; and identifying among said plurality of XBRL concepts a plurality of unattached concepts that are not attached to any of said set of explicit XBRL hypercubes.

9. The method of claim 5, wherein identifying said plurality of implicitly-attached concepts comprises:

identifying a set of explicit XBRL hypercubes, including said XBRL hypercube, whose definitions are mirrored in said XBRL linkbase; and identifying among said plurality of XBRL concepts a plurality of unattached concepts that are not attached to any of said set of explicit XBRL hypercubes.

10. A computing apparatus for mapping eXtensible Business Reporting Language ("XBRL") data to a flat table, the apparatus comprising a processor and a memory storing instructions that, when executed by the processor, configure the apparatus to:

obtain an XBRL linkbase describing relationships among a plurality of XBRL concepts;

identify an XBRL hypercube to which at least some of said plurality of XBRL concepts are attached as XBRL measures;

identify a ubiquitous dimension-like XBRL element associated with said XBRL hypercube and a set of one or more non-ubiquitous dimension-like XBRL elements defined in said XBRL hypercube, said ubiquitous dimension-like XBRL element being ubiquitous among XBRL-structured data;

initialize a tabular data structure including a value column for storing facts, a concept column for storing fact-associated concepts, a ubiquitous-dimension column, and one or more non-ubiquitous-dimension columns;

generate a data map mapping said XBRL measures of said XBRL hypercube to said concept column, mapping said ubiquitous dimension-like XBRL element of said XBRL hypercube to said ubiquitous-dimension column, and respectively mapping said set of one or more non-ubiquitous dimension-like XBRL elements of said XBRL hypercube to said one or more non-ubiquitous-dimension columns;

store said data map and said tabular data structure;

obtain XBRL instance data comprising a plurality of facts and associated metadata;

using said data map, select from said XBRL instance data a plurality of hypercube-attached facts that are respectively associated with any one of said plurality of XBRL measures and that are explicitly or implicitly associated with exactly said set of one or more non-ubiquitous dimension-like XBRL elements;

using said data map, populate said tabular data structure with a plurality of rows corresponding respectively to said plurality of hypercube-attached facts; and provide said populated tabular data structure for display to a user.

11. The apparatus of claim 10, wherein the instructions that configure the apparatus to populate said tabular data structure further comprise instructions configuring the apparatus to, for each of said plurality of hypercube-attached facts:

add a row to said tabular data structure;

populate said value column of said added row with a current hypercube-attached fact;

determine a fact-associated measure of said plurality of XBRL measures as being associated with said current hypercube-attached fact;

populate said concept column of said added row with said fact-associated measure;

determine a fact-associated ubiquitous metadata value that is associated with said current hypercube-attached fact and that corresponds to said ubiquitous dimension-like XBRL element;

using said data map, populate said ubiquitous-dimension column with said fact-associated ubiquitous metadata value;

determine one or more fact-associated non-ubiquitous metadata values that are associated with said current hypercube-attached fact and that respectively correspond to said set of one or more non-ubiquitous dimension-like XBRL elements;

using said data map, respectively populate said one or more non-ubiquitous-dimension columns with said one or more fact-associated non-ubiquitous metadata values.

12. The apparatus of claim 11, wherein the instructions that configure the apparatus to determine said one or more fact-associated non-ubiquitous metadata values further comprise instructions configuring the apparatus to:

determine that said XBRL instance data does not explicitly associate said current hypercube-attached fact with a metadata value corresponding to at least one of said set of one or more non-ubiquitous dimension-like XBRL elements;

obtain a hypercube definition defining said XBRL hypercube, said hypercube definition including a default value corresponding to said at least one of said set of one or more non-ubiquitous dimension-like XBRL elements; and implicitly associate said default value with said current hypercube-attached fact.

13. The apparatus of claim 12, wherein the instructions that configure the apparatus to provide said populated tabular data structure for display to said user further comprise instructions configuring the apparatus to make said default value identifiable as having been implicitly associated with said current hypercube-attached fact.

14. The apparatus of claim 10, wherein the memory stores further instructions that further configure the apparatus to:

identify among said plurality of XBRL concepts a plurality of implicitly-attached concepts that are implicitly attached to an implicit empty hypercube that is associated with said ubiquitous dimension-like XBRL element;

initialize a second tabular data structure including a second value column, a second concept column, and a second ubiquitous-dimension column; and update said data map to further map said plurality of implicit measures of said implicit empty hypercube to said second concept column, and to further map said ubiquitous dimension-like XBRL element of said implicit empty hypercube to said second ubiquitous-dimension column.

15. The apparatus of claim 14, wherein the memory stores further instructions that further configure the apparatus to:

select from said XBRL instance data a plurality of implicitly-attached facts that are respectively associated with any one of said plurality of implicit measures;

using said data map, populate said second tabular data structure with a plurality of rows corresponding respectively to said plurality of implicitly-attached facts; and provide said populated second tabular data structure for display to a user.

16. The apparatus of claim 15, wherein the instructions that configure the apparatus to populate said second tabular data structure further comprise instructions configuring the apparatus to, for each of said plurality of implicitly-attached facts:

add a row to said second tabular data structure;

populate said second value column of said added row with a current implicitly-attached fact;

determine a fact-associated implicit measure of said plurality of implicit measures as being associated with said current implicitly-attached fact;

populate said second concept column of said added row with said fact-associated implicit measure; and determine a fact-associated ubiquitous metadata value that is associated with said current implicitly-attached fact and that corresponds to said ubiquitous dimension-like XBRL element.

17. The apparatus of claim 14, wherein the instructions that configure the apparatus to identify said plurality of implicitly-attached concepts further comprise instructions configuring the apparatus to:

identify a set of explicit XBRL hypercubes, including said XBRL hypercube, to which any of said plurality of XBRL concepts are attached as XBRL measures; and identify among said plurality of XBRL concepts a plurality of unattached concepts that are not attached to any of said set of explicit XBRL hypercubes.

18. The apparatus of claim 14, wherein the instructions that configure the apparatus to identify said plurality of implicitly-attached concepts further comprise instructions configuring the apparatus to:

identify a set of explicit XBRL hypercubes, including said XBRL hypercube, whose definitions are mirrored in said XBRL linkbase; and identify among said plurality of XBRL concepts a plurality of unattached concepts that are not attached to any of said set of explicit XBRL hypercubes.

19. A non-transitory computer-readable storage medium having stored thereon instructions that, when executed by a processor, configure the processor to:

obtain an XBRL linkbase describing relationships among a plurality of XBRL concepts;

identify an XBRL hypercube to which at least some of said plurality of XBRL concepts are attached as XBRL measures;

identify a ubiquitous dimension-like XBRL element associated with said XBRL hypercube and a set of one or more non-ubiquitous dimension-like XBRL elements defined in said XBRL hypercube, said ubiquitous dimension-like XBRL element being ubiquitous among XBRL-structured data;

initialize a tabular data structure including a value column for storing facts, a concept column for storing fact-associated concepts, a ubiquitous-dimension column, and one or more non-ubiquitous-dimension columns;

generate a data map mapping said XBRL measures of said XBRL hypercube to said concept column, mapping said ubiquitous dimension-like XBRL element of said XBRL hypercube to said ubiquitous-dimension column, and respectively mapping said set of one or more non-ubiquitous dimension-like XBRL elements of said XBRL hypercube to said one or more non-ubiquitous-dimension columns;

store said data map and said tabular data structure;

obtain XBRL instance data comprising a plurality of facts and associated metadata;

using said data map, select from said XBRL instance data a plurality of hypercube-attached facts that are respectively associated with any one of said plurality of XBRL measures and that are explicitly or implicitly associated with exactly said set of one or more non-ubiquitous dimension-like XBRL elements;

using said data map, populate said tabular data structure with a plurality of rows corresponding respectively to said plurality of hypercube-attached facts; and provide said populated tabular data structure for display to a user.

20. The non-transitory computer-readable storage medium of claim 19, wherein the instructions that configure the processor to populate said tabular data structure further comprise instructions configuring the processor to, for each of said plurality of hypercube-attached facts:

add a row to said tabular data structure;

populate said value column of said added row with a current hypercube-attached fact;

determine a fact-associated measure of said plurality of XBRL measures as being associated with said current hypercube-attached fact;

populate said concept column of said added row with said fact-associated measure;

determine a fact-associated ubiquitous metadata value that is associated with said current hypercube-attached fact and that corresponds to said ubiquitous dimension-like XBRL element;

using said data map, populate said ubiquitous-dimension column with said fact-associated ubiquitous metadata value;

determine one or more fact-associated non-ubiquitous metadata values that are associated with said current hypercube-attached fact and that respectively correspond to said set of one or more non-ubiquitous dimension-like XBRL elements;

using said data map, respectively populate said one or more non-ubiquitous-dimension columns with said one or more fact-associated non-ubiquitous metadata values.

21. The non-transitory computer-readable storage medium of claim 20, wherein the instructions that configure the processor to determine said one or more fact-associated non-ubiquitous metadata values further comprise instructions configuring the processor to:

determine that said XBRL instance data does not explicitly associate said current hypercube-attached fact with a metadata value corresponding to at least one of said set of one or more non-ubiquitous dimension-like XBRL elements;

obtain a hypercube definition defining said XBRL hypercube, said hypercube definition including a default value corresponding to said at least one of said set of one or more non-ubiquitous dimension-like XBRL elements; and implicitly associate said default value with said current hypercube-attached fact.

22. The non-transitory computer-readable storage medium of claim 21, wherein the instructions that configure the processor to provide said populated tabular data structure for display to said user further comprise instructions configuring the processor to make said default value identifiable as having been implicitly associated with said current hypercube-attached fact.

23. The non-transitory computer-readable storage medium of claim 19, wherein the memory stores further instructions that further configure the processor to:

identify among said plurality of XBRL concepts a plurality of implicitly-attached concepts that are implicitly attached to an implicit empty hypercube that is associated with said ubiquitous dimension-like XBRL element;

initialize a second tabular data structure including a second value column, a second concept column, and a second ubiquitous-dimension column; and update said data map to further map said plurality of implicit measures of said implicit empty hypercube to said second concept column, and to further map said ubiquitous dimension-like XBRL element of said implicit empty hypercube to said second ubiquitous-dimension column.

24. The non-transitory computer-readable storage medium of claim 23, wherein the memory stores further instructions that further configure the processor to:

select from said XBRL instance data a plurality of implicitly-attached facts that are respectively associated with any one of said plurality of implicit measures;

using said data map, populate said second tabular data structure with a plurality of rows corresponding respectively to said plurality of implicitly-attached facts; and provide said populated second tabular data structure for display to a user.

25. The non-transitory computer-readable storage medium of claim 24, wherein the instructions that configure the processor to populate said second tabular data structure further comprise instructions configuring the processor to, for each of said plurality of implicitly-attached facts:

add a row to said second tabular data structure;

populate said second value column of said added row with a current implicitly-attached fact;

determine a fact-associated implicit measure of said plurality of implicit measures as being associated with said current implicitly-attached fact;

populate said second concept column of said added row with said fact-associated implicit measure; and determine a fact-associated ubiquitous metadata value that is associated with said current implicitly-attached fact and that corresponds to said ubiquitous dimension-like XBRL element.

26. The non-transitory computer-readable storage medium of claim 23, wherein the instructions that configure the processor to identify said plurality of implicitly-attached concepts further comprise instructions configuring the processor to:

identify a set of explicit XBRL hypercubes, including said XBRL hypercube, to which any of said plurality of XBRL concepts are attached as XBRL measures; and identify among said plurality of XBRL concepts a plurality of unattached concepts that are not attached to any of said set of explicit XBRL hypercubes.

27. The non-transitory computer-readable storage medium of claim 23, wherein the instructions that configure the processor to identify said plurality of implicitly-attached concepts further comprise instructions configuring the processor to:

identify a set of explicit XBRL hypercubes, including said XBRL hypercube, whose definitions are mirrored in said XBRL linkbase; and identify among said plurality of XBRL concepts a plurality of unattached concepts that are not attached to any of said set of explicit XBRL hypercubes.

* * * * *